May 8, 1934.　　　H. I. BECKER　　　1,958,259
AUTOMATIC STEERING EQUIPMENT
Filed Aug. 12, 1931
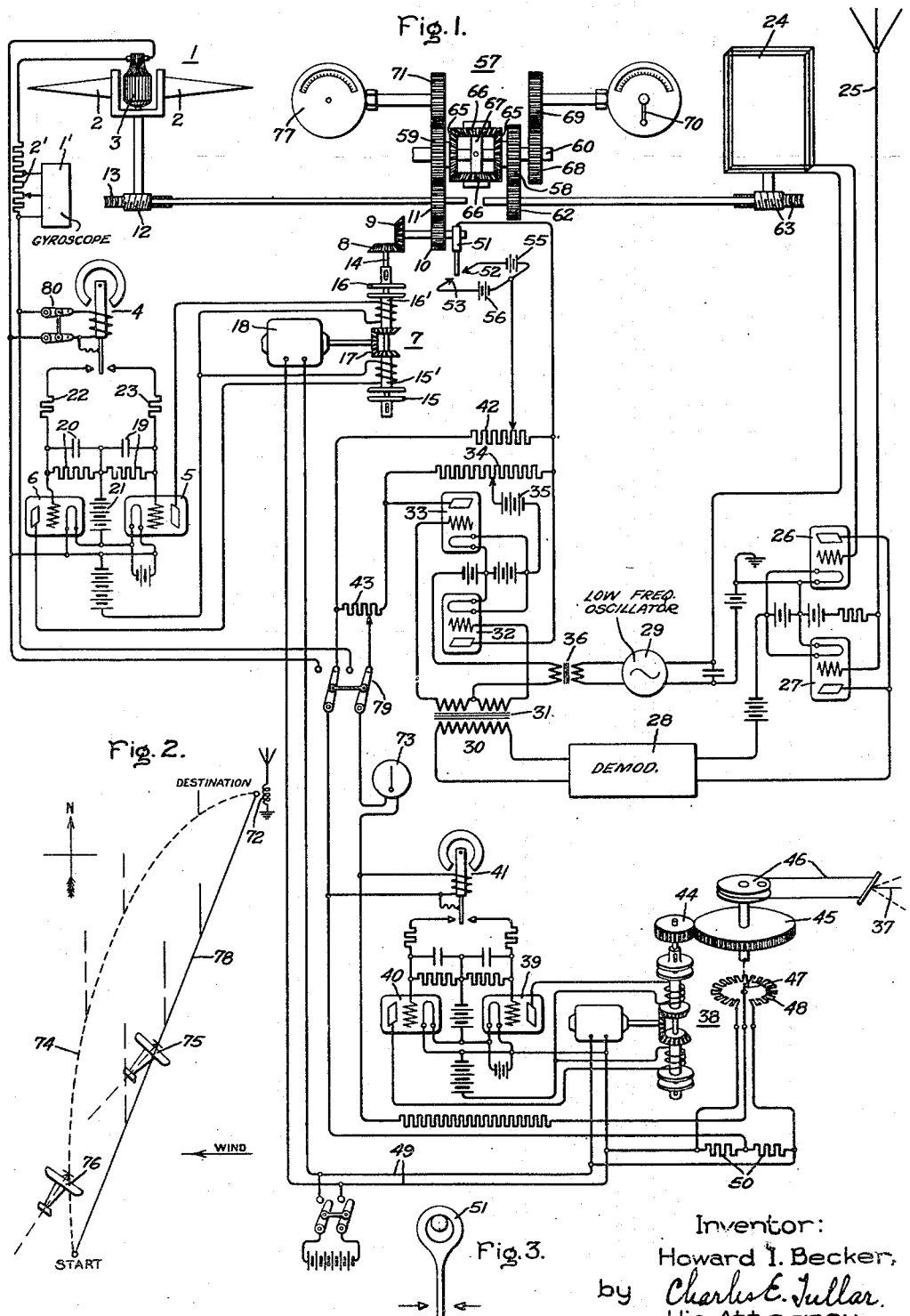
Inventor:
Howard I. Becker,
by Charles E. Tullar.
His Attorney.

Patented May 8, 1934

1,958,259

UNITED STATES PATENT OFFICE 1,958,259

AUTOMATIC STEERING EQUIPMENT

Howard I. Becker, Schenectady, N. Y., assignor to General Electric Company, a corporation of New York Application August 12, 1931, Serial No. 556,605

20 Claims. (Cl. 172—282)

My invention relates to automatic steering of moving craft, such as air or water craft, and more particularly to means employing radio equipment for control of the steering system.

A number of different systems have been devised whereby moving craft are automatically guided along a straight course, as along a course having a direction determined with reference to the direction of the earth's magnetic field. While craft may be very satisfactorily guided by reference to a predetermined direction, it is desirable in order to overcome the effects of drift that the course should be determined by reference to a particular point, such as the destination of the craft. That is, if a craft, attempting to follow a predetermined straight course leading to its destination but which is determined only by reference to a certain direction, as by reference to the direction of the earth's magnetic field, or by a gyroscope, drifts from the course, due to wind without change in the direction of the fore and aft line of the craft, it is obvious that it will miss its destination. Accordingly, it is desirable that means be provided to alter the direction of the fore and aft line of the craft when it deviates from its course in such a way as to return the craft to the course which when followed in the predetermined direction leads to the point of destination.

In a copending application, Serial No. 550,974, of Ernst F. W. Alexanderson, filed July 15, 1931, entitled Automatic steering system, and which is assigned to the same assignee as my present application, is disclosed a system by which moving craft may be automatically steered along a course which is marked out to the craft by means of a radio beacon.

One of the objects of my invention is to provide a system in which the course fínown by the craft with reference to a stationary point, such as the destination of the craft, is predetermined by adjustment of equipment on the craft itself and which avoids the necessity for marking out the course, as by means of a radio beacon.

Thus, in accordance with my invention the radio transmitting equipment may be such as to transmit radio waves uniformly in all directions and may comprise any convenient broadcasting station, for example, which may be located in proximity to the destination of the craft.

The equipment on the craft is then adjusted to predetermine a course to be followed by reference to the location of the source of received oscillations and the angle formed by the direction of the earth's magnetic field and a line joining the craft and said source. Thus, the course is determined by reference to a point on the earth's surface and an angle with the earth's magnetic field.

Another object of my invention, therefore, is to provide a system whereby the craft may be steered in accordance with the direction of propagation of received radio waves and at a predetermined angle with reference to the earth's magnetic field.

A further object of my invention is to provide means whereby the directivity of a radio receiver may be controlled in accordance with the direction of the earth's magnetic field.

Still a further object of my invention is to provide an automatic steering system in which a magnetic compass and directive antenna are employed and automatically maintained at a predetermined angle with reference to each other and in which the craft is so steered as to maintain both the loop and the compass satisfied.

While, to describe a specific embodiment of my invention, I have chosen one in which an indicator compass is employed to produce response to deviation of the craft from its predetermined straight course by turning, it will be understood that any suitable direction sensitive device, such as a gyroscope, may likewise be employed.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing, in which Fig. 1 represents an embodiment of my invention; Fig. 2 represents a certain characteristic of its operation; and Fig. 3 represents a detail.

Referring to Fig. 1 of the drawing, I have indicated at 1 a magnetic compass which may be of any suitable construction and which in the form shown comprises a pair of pole pieces 2 and an armature 3, the latter of which is rotated by means, not shown, in the field established by the pole pieces 2. When the pole pieces 2 are at right angles to the direction of the earth's magnetic field, no voltage is set up across the armature 3. When, however, the craft turns either to the right or to the left, then voltage is induced in the armature winding having a polarity dependent upon the direction of turn of the craft.

Means are provided in accordance with my invention whereby the compass tends automatically to maintain itself in such a position with respect to the earth's magnetic field that no voltage is set up across the armature. This means comprises a polarized relay 4 which is connected directly across the armature of the compass and which is arranged through vacuum tubes 5 and 6 and magnetic clutching mechanism 7 to control the direction of rotation of a bevel gear 8. This bevel gear 8 cooperates with an additional bevel gear 9 which is arranged on the shaft with a gear 10 which in turn meshes with a gear 11. The gear 11 is arranged on a common shaft with worm 12 which cooperates with a worm wheel 13 and thereby causes rotation of the worm wheel 13 in one direction or the other, dependent upon the voltage induced across the armature 3. This worm wheel is connected directly with the pole pieces of the magnetic compass whereby in response to any voltage set up across the armature the pole pieces are revolved in such a direction that this voltage is reduced to zero.

The gear 8 is arranged on a shaft 14 which extends through the clutching mechanism 7 and carries two oppositely disposed discs 15 and 16 at the opposite ends thereof. These discs are arranged for rotation with the shaft 14 but are movable longitudinally thereof. These discs comprise friction clutching members each of which cooperates with an opposite clutching member 15' 16'. These latter clutching members are mounted loosely upon the shaft 14 and are arranged for rotation in opposite directions by means of a bevel gear mechanism 17 which is driven by means of a motor 18. This clutching mechanism, however, may be of any suitable construction, and may, for example, be of the type shown in United States Patent No. 1,169,937, issued February 1, 1916, to M. J. Dikeman.

The rotatable clutching members 15' and 16' have suitable coils wound thereon, each coil being connected in the anode circuit of one of the vacuum tubes 5 and 6 whereby these coils are selectively energized in response to operation of the relay 4. The grids of the vacuum tubes 5 and 6 are each connected to the cathode through a resistance and capacitance combination 19 and 20 respectively and a common source of bias potential 21. This source of bias potential is of such a value that normally no current flows in the anode circuit of the discharge devices. Each grid, however, is also connected through a suitable low resistance 22, 23, respectively, to the opposite contacts of the polarized relay 4, the movable contact of which is connected to the cathodes of the discharge devices. Thus, upon movement of the armature of relay 4 in either direction the voltage upon the grids of the respective vacuum tubes is sufficiently diminished to cause current to flow in the anode circuit, thereby energizing the respective clutching members 15', 16'. The energized clutch member then attracts the cooperating clutch member 15, 16, which in turn causes rotation of the shaft 14 and hence actuation of the pole pieces 2 in a direction such that the voltage across the armature is reduced and the relay 4, therefore, returns to its neutral position.

Thus, the magnetic compass tends to maintain itself in an east-west position; that is, at such an angle with reference to the lines of magnetic force that no voltage is produced across the armature. It will, of course, be understood that other means may be employed whereby the compass is adjusted to zero voltage when the pole pieces deviate from the east-west position, such for example as means for shifting the brushes about the armature.

For the purpose of correcting certain errors which occur in the operation of the compass due to the effect of the vertical component of the earth's magnetic field upon turning of the craft, a gyroscopic device, which I have indicated by a rectangle 1', is provided and arranged to produce an electromotive force on resistance 2' connected in series with the armature, sufficient to compensate for this error. Since this gyroscopic device is well known in the art, having been fully described by Dr. J. D. Tear and E. J. Lawton in the General Electric Review for April, 1931, no description of it will be made here.

While the craft may be steered, by the means already described, along a course determined by a predetermined angle with reference to the direction of the earth's magnetic field, in accordance with my invention this equipment is combined with a radio direction-finding device whereby the craft is not only maintained on a course having a predetermined angle with the direction of the earth's magnetic field, but is also maintained upon a course leading to its destination notwithstanding any forces, such as that produced by wind, which tend to cause the craft to drift from its course.

This direction finding equipment is shown at the right-hand portion of the drawing as a directive radio receiver comprising a directive antenna 24, which I have shown in the form of a loop, and a non-directive antenna 25. These antennæ are connected respectively to the grids of electron discharge amplifiers 26 and 27. The anode of these discharge devices are connected in parallel and are arranged to supply the amplified oscillations to the input circuit of a suitable demodulator 28. The grid circuit of vacuum tube 26 also includes a source of low frequency oscillations 29 whereby the bias upon the grid and therefore the amplification of this discharge device is varied in a sinusoidal way. Thus, this tube 26 acts as a modulator of oscillations received from the loop 24. The oscillations from the loop 24 which are amplified and modulated by the discharge device 26 are combined with oscillations received from the vertical antenna 25 upon the anode circuit of the discharge device 27. The oscillations received from the loop may be combined with those received from the non-directive antenna either in phase or in opposed phase relation, dependent upon the position of the loop with respect to the direction of propagation of the received waves. If the loop is at right angles to the direction of the propagation of the received waves, then no received oscillations are impressed upon the grid of discharge device 26, and accordingly the only oscillations supplied to the demodulator 28 are those received from the vertical antenna 25 and amplified by amplifier 27. If the loop is moved in one direction, however, from this position, oscillations are received upon the grid which combine with the oscillations received from the non-directive antenna in opposed phase relation. If the loop is moved in the opposite direction, these oscillations combine with oscillations received from the non-directive antenna in like phase relation. Thus, the oscillations which are supplied to the demodulator 28 from the non-directive antenna 25 are sinusoidally increased or decreased, dependent upon the position of the loop 24. Thus, if oscillations received from the two antennæ combine in phase, then the oscillations supplied to the demodulator 28 are of maximum value when the amplification of device 26 is maximum, and, similarly, the oscillations supplied to demodulator 28 are minimum when the amplification of device 26 is minimum. If the loop 24, however, is in such a position that the two oscillations combine in opposed phase relation, then the oscillations supplied to demodulator 28 are maximum when the amplification of device 26 is minimum, and vice versa. Thus, as a result of demodulation of the oscillations supplied to the demodulator 28, currents having the frequency of the source 29 are reproduced and supplied to the output circuit 30. These currents have a time phase relation, however, dependent upon the position of the loop 24. That is, if the loop is at right angles to the direction of propagation no oscillations are received from the loop and accordingly no oscillations appear in the output circuit 30. If the loop is moved to one direction from this position, however, oscillations appear in the output circuit 30 having a certain time phase relation, whereas if the loop is moved in the opposite direction then the oscillations produced in circuit 30 are shifted in phase by 180°.

It will of course be understood that the demodulating equipment 28 may also include suitable radio and audio amplifying equipment whereby the reproduced currents are of suitable value.

Means are provided on the craft whereby an electromotive force is produced having polarity dependent upon the time phase relation of oscillations appearing in the output circuit 30 and magnitude dependent upon the amplitude of these oscillations. This means comprises vacuum tubes 32 and 33 to the grids of which these oscillations are supplied in opposite phase, as through transformer 31. Between the anodes of these discharge devices a resistance 34 is connected, the mid-point of which resistance is connected to the cathodes through a source of electromotive force 35. Oscillations from the source 29 are also supplied directly to the grids of the vacuum tubes 32 and 33 through a transformer 36, the secondary winding of which is connected between the cathodes of the discharge device and the mid-point on the secondary winding of the transformer 31. Thus, these oscillations are supplied to the two grids in phase. The grids of the vacuum tubes 32 and 33 are so biased that about equal current flows in the opposite halves of the resistance 34, with the result that normally no voltage occurs between the terminals of this resistance. If, however, the oscillations supplied by the output circuit 30 are of such time phase relation that they combine with the oscillations produced on the secondary winding of the transformer 36 in aiding relation on the grid of vacuum tube 33 and in opposed relation on the grid of vacuum tube 32, then an increase in current takes place in the left-hand portion of resistance 34 and a diminution in current takes place in the right-hand portion of resistance 34. Thus, a voltage is set up between the terminals of resistance 34 having a certain polarity.

If, however, the loop 24 is changed in position thereby to shift the time phase relation of the oscillations supplied to transformer 31 through 180 degrees, then the two oscillations supplied to the grid combine in aiding relation on the grid of vacuum tube 32 and in opposed relation on the grid of vacuum tube 33, with the result that a voltage is produced between the terminals of resistance 34 having opposite polarity to that previously produced.

Thus, a voltage is produced on resistance 34 having a polarity dependent upon the position of the loop 24. Since the amplitude of the oscillations supplied by the loop 24 to the grid 26 also varies with the angular displacement of the loop 24 from the position at right angles to the direction of propagation of the received waves, the magnitude of the voltage produced on resistance 34 also varies with this angular displacement.

This voltage which is produced on resistance 34 is utilized to control a visual indicating device 73 and also to control the rudder of the craft.

The visual indicating device serves to produce an indication of the direction of the source of received oscillations from the craft. That is, if the loop is at right angles to the direction of propagation of received oscillations, the index of the indicating device remains at the center of the scale, whereas if the loop is moved in either direction the index deflects in a corresponding direction. In the system shown, this instrument serves as a visual check upon the operation of the equipment.

The rudder of the craft is indicated in the drawing at 37 and is arranged to be operated through a suitable magnetic clutch arrangement 38 similar to the clutch arrangement 7. This clutching mechanism is controlled by a pair of vacuum tubes 39 and 40 and a polarized relay 41, all in a manner which has previously been described in connection with vacuum tubes 5 and 6 and polarized relay 4.

The resistance 34 is connected in series with resistances 42 and 43, the polarized relay 41 being connected across a portion of resistance 43. As thus arranged, if the position of the loop 24 is such that the polarity of voltage between the terminals of resistance 34 is in a certain direction, then the armature of relay 41 will be operated into engagement with one of its opposite contacts, thereby causing energization of the respective clutch magnet and operation of the rudder 37 in a corresponding direction. If the loop 24 is in such position that the polarity of voltage on resistance 34 is reversed, then the armature of relay 41 is operated into engagement with its opposite contact, thereby energizing the opposite magnet and the clutch 38 and causing actuation of the rudder 37 in the opposite direction. The rudder 37 is operated by the clutch mechanism 38 through a pair of gears 44 and 45 and a cord and pulley arrangement 46, the pulley being arranged on the shaft with gear 45.

The shaft of gear 45 is also provided with a contact 47 which moves over a circular potentiometer 48 the opposite terminals of which are connected to opposite power supply conductors 49. This potentiometer 48 is also connected in bridge relation with a resistance 50 which is likewise connected between the power supply conductors 49, the midpoint of resistance 50 and the movable contact 47 being connected to opposite terminals of the winding of relay 41. In this way a suitable follow-up arrangement is provided whereby when the rudder 37 is in a neutral position no voltage is supplied to polarized relay 41 by the bridge arrangement 48 and 50. However, upon any movement of the rudder 37 in response to operation of relay 41, a potential is supplied through contact 47 back upon the circuit of the winding of relay 41, this potential having such polarity as to tend to neutralize the voltage which causes actuation of the relay 41.

The resistance 42, which I have described as connected in series with the resistance 34, is utilized to introduce a voltage into this circuit in response to operation of the compass 3. Thus, for example, on the shaft of gear 9 is frictionally mounted a contact 51 which cooperates with two oppositely disposed contacts 52 and 53. The manner in which contact 51 is arranged upon the shaft of gear 9 is shown in an exaggerated way in Fig. 3, but it is such that if the shaft rotates in one direction the contact 51 rotates in the corresponding direction until it engages the respective stationary contact, after which it remains in that position until rotation of the shaft 9 ceases, when it returns to its neutral position. Each of contacts 52 and 53 are connected to a point on resistance 42 through batteries 55 and 56, which are oppositely polarized. The contact 51 is connected to a terminal of resistance 42 whereby a voltage is set up across the right-hand portion of resistance 42 having a polarity dependent upon the direction of movement of the poles of the magnetic compass. This voltage combines with the voltage produced on resistance 34 to produce certain effects which will later be described.

The loop 24 is interconnected with the pole pieces of the magnetic compass through a suitable differential gear arrangement 57, and is thereby arranged to be maintained automatically at a predetermined angle with reference to the pole pieces of the compass independently of movement of the craft. This differential mechanism 57 is arranged between two gears 58 and 59 which are loosely mounted upon a shaft 60. The gear 58 cooperates with a gear 62 which serves to control the position of the loop through a worm and worm wheel 63. The gear 59 cooperates with a gear 11 which, as previously described, cooperates with the gear 10 and serves to drive the worm 12 and worm gear 13, thereby to position the pole pieces of the magnetic compass. The differential comprises oppositely arranged bevel gears 65 which are made integral respectively to the gears 59 and 58 and between which are disposed additional bevel gears 66, these latter bevel gears being arranged for rotation above the shaft 67 at right angles to the shaft 60 and which is connected to the shaft 60 to cause rotation thereof about its own axis. The shaft 60 is also rotated by means of gears 68 and 69 which may be manually operated by means of a course setting device 70. An indicating device is also operated by gear 71 which cooperates with the gear 59.

As thus arranged, the operation of the system is as follows: Let us assume that the craft, which may be an aircraft for example, is at a position indicated "Start" in Fig. 2, and that it desires to fly to a point indicated "Destination" in this figure. Also, let us assume that in proximity to the destination of the air-craft is a radio transmitting system, which I have indicated by a simple antenna 72. This radiating system may be any system whereby waves are radiated into space, such, for example, as an ordinary broadcast antenna. The pilot, of course, desires to fly on a straight line 78 between these two points. However, if the pilot attempts by manually steering the craft to follow this course in accordance with indications produced by an ordinary direction finding system, or homing device, or by the meter 73 of the direction finding device of the present disclosure, if it be assumed that no automatic drift compensation is employed, the actual course taken by the craft will be dependent upon the direction and velocity of the wind. Thus, for example, if we assume wind blowing from the right, as indicated by the arrow bearing the legend "Wind" in the drawing, the craft will take a curved course, which I have indicated by the dotted line 74, although it may be continuously headed toward the destination. Due to the wind it drifts bodily to the left without changing the direction of its fore and aft line. When automatically steered by the equipment described, however, and in accordance with my invention, the fore and aft line of the craft is caused to vary in such a way that the craft actually heads into the wind at an angle sufficient to overcome the effect of drift and to maintain itself on the true course. Thus, for example, the craft may take a position with reference to the course such as that indicated at 75, where the fore and aft line of the craft is shown at a substantial angle to the true course and the craft is indicated as heading into the wind, but following the true course. The craft, therefore, tends to fly more or less sidewise, or to "crab" along the course.

In adjusting the equipment for automatic steering, the pilot first determines the angle between the direction of the earth's magnetic field, which I have indicated by the arrow N and by lines parallel thereto in the drawing, and the direction of the destination of the craft. By means of the course setting device 70 he adjusts the loop 24 to an equal angle with reference to the pole pieces of the magnetic compass.

The craft then starts out and heads directly toward its destination, its fore and aft line being parallel with the true course. Under these conditions both the compass and the radio receiver are satisfied; that is, the poles of the compass are in the east-west position and no voltage is produced across the armature. The loop 24 is at right angles with the direction of propagation of the received waves, with the result that no voltage is produced on resistance 34. Let us assume, however, that due to the wind blowing from the right, as indicated by the arrow, the craft drifts bodily toward the left. Since the direction of the fore and aft line is unchanged, the compass remains satisfied. The loop, however, is no longer at right angles to the direction of the received waves. Accordingly, a voltage appears across the resistance 34. This voltage causes energization of polarized relay 41 which actuates its armature for example to the right, thereby, through vacuum tube 39, causing energization of the upper magnet of the clutching mechanism 38. The rudder is thus operated through gears 44 and 45 and the cord and pulley arrangement 46 in a direction tending to steer the craft toward the course. Upon any movement of the rudder, however, the contact 47 cooperating with potentiometer 48 is correspondingly operated and supplies voltage back into the circuit of the winding of polarized relay 41 in a direction to cause deenergization of that relay. Also, simultaneously with the movement of the rudder the craft starts to turn into a position such as that indicated at 76 in Fig. 2. When this occurs, however, the poles of the magnetic compass are moved out of the east-west position, with the result that a certain voltage is set up across the armature, this voltage energizing polarized relay 4, thereby causing actuation of its armature, for example, toward the right. This in turn, through action of the discharge device 5, energizes the upper magnet of the clutching mechanism 7, thereby causing actuation of the gears 8, 9, 10, 11, 64, worm 12, and worm wheel 13, which causes the poles of the compass to move back into the east-west position. At the same time that this occurs, however, gears 59 and 71 are actuated and produce a corresponding indication on the dial 77. Since the shaft 60 is held stationary by the course setting device 70, gear 58 is rotated through action of gear 66, thereby causing actuation of gear 62 and of the worm and gear 63 which in turn causes the loop to be so actuated that the angle between the loop and the poles of the magnetic compass is maintained constant. Upon any turning of the compass in response to turning of the craft through actuation of gears 8, 9, 11, 64, 12, and 13, contact 51 is brought into engagement either with contact 52 or 53, thereby also supplying a voltage into the circuit of resistances 42, 43 and 34, having a polarity tending to cause deenergization of the relay 41.

It will appear, however, that before the voltage due to operation of contact 51 or 47 is supplied back into the circuit of relay 41 sufficient to cause deenergization of that relay, the craft must necessarily have turned through a certain angle. This angle may be sufficient to cause the craft to head into the wind sufficiently to maintain itself on the course. If it is not, however, the loop will remain unsatisfied, with the result that the cycle of operations is repeated and the craft is given a further turn with respect to the course, while the compass maintains itself in the east-west position and the loop at the constant angle with respect thereto. The effect of contact 51 is to lessen the duration of the successive movements of the craft, thereby causing it to hitch itself through successive increments of angular movement until it occupies a position such that both the compass and loop are satisfied. Thus, through repeated operations of the equipment as described, the craft maintains itself continuously at an angle with reference to the course such that it follows the course to its destination. If the wind lessens or changes its direction, the relays 41 and 4 are operated in the opposite direction thereby to correspondingly adjust the rudder to maintain the fore and aft line of the craft at a proper angle with respect to the course.

The actual movement of the craft under control of the equipment occurs in rapid increments which are so small as to avoid any noticeable step by step effect, the equipment tending to maneuver the craft along the course in a manner to just overcome the tendency to drift and in a smooth and satisfactory way.

The indicating device 77 indicates the angle of the ship with reference to north, and the device 70 indicates the angle of the course with reference to north, i. e., the original course setting. The difference between the indications of these two devices therefore indicates the angle of the ship with reference to the course, i. e., the angle of drift.

If desired at any time, as in case of absence of drift, the craft may be automatically steered by the compass alone. For this purpose double throw switch 79 is provided in the connection between the polarized relay 41 of the steering engine and resistance 43. By operating this switch to the left the steering engine is disconnected from the radio equipment and is connected directly to the output from the compass. In this way the craft is steered entirely by compass control. Under this condition it is desirable to interrupt the circuit of relay 4 by operating switch 80 to the open position.

While I have shown a particular embodiment of my invention, it will of course be understood that I do not wish to be limited thereto, since many modifications, both in the circuit arrangement and in the instrumentalities employed, may be made. I contemplate by the appended claims to cover any such modifications as fall within the true spirit and scope of my invention.

What I claim as new and desire to secure by Letters Patent of the United States, is:

1. The combination in a system for steering moving craft, of means for automatically steering the craft along a predetermined straight course, said means including a directive radio receiver carried by the craft and arranged to produce a certain effect in response to waves received from a particular direction, means for controlling said receiver to produce said effect irrespective of the direction of movement of the craft and means for controlling said first means in response to the effect produced by said directive radio receiver.

2. The combination on a moving craft of a compass, a directive antenna, means to maintain a constant angle between said directive antenna and compass, and means so to steer said craft that both said compass and antenna are satisfied irrespective of forces tending to move said craft out of a course determined by the direction, with respect to north, of propagation of radio waves intercepted by said directive antenna.

3. The combination on a moving craft, of a compass, a directive radio receiver, means responsive to said compass to maintain the craft on a course extending through a predetermined point and at a predetermined angle with reference to the direction of the earth's magnetic field, and means responsive to said directive radio receiver to overcome the effects of external forces tending to cause the craft to deviate from said course extending through said predetermined point.

4. The combination on a moving craft, of a directive antenna, means for maintaining said antenna at a constant angle with reference to the earth's magnetic field irrespective of movement of the craft, and means responsive to the output from said antenna for steering the craft.

5. The combination on a moving craft, of a directive radio receiver, means controlled by said receiver for steering the craft in a direction determined by the direction of propagation of received radio waves, and means controlled by the direction of the earth's magnetic field to control the directivity of said radio receiver.

6. The combination on a moving craft having a rudder, of a compass, a directive radio receiver, means for controlling said rudder in response to said radio receiver, and means responsive to the compass to control the directivity of said radio receiver.

7. The combination on a moving craft, of means for automatically steering the craft in a predetermined direction with reference to the earth's magnetic field, means for steering the craft in response to the direction of propagation of received radio waves, and means for so coordinating said last two means that the craft follows a continuous straight course irrespective of forces tending to cause said craft to drift away from said course.

8. In combination, means for producing an electromotive force having polarity dependent upon the direction to which said craft is headed with reference to the earth's magnetic field, means for producing an electromotive force having polarity dependent upon the direction of movement of the craft with reference to the direction of propagation of received radio waves, means controlled by said electromotive forces for steering the craft, and means for so coordinating said first two means that the craft follows a course at a constant angle to the earth's magnetic field.

9. The combination on a moving craft, of a directive antenna, means controlled by said directive antenna for automatically steering the craft along a course having a predetermined angle with reference to the earth's magnetic field, and means for maintaining said directive antenna in a predetermined position with reference to the direction of the earth's magnetic field independently of the angle between said craft and said course.

10. The combination on a moving craft, of means for automatically steering the craft along a predetermined course, means for automatically controlling said last means to vary the fore and aft line of the craft in such a way that the craft follows said course irrespective of forces tending to cause the craft to drift away from said course, and means for indicating the angle between said fore and aft line and said course.

11. The combination on an air craft, of means for automatically steering said craft along a predetermined course, means responsive to drift of said craft to cause the craft to head toward the course by an angle sufficient to overcome the effects of the forces tending to cause the craft to drift and thereby maintain the craft on the course, and means for indicating the angle between the craft and the course.

12. The combination on a moving craft, of a compass, a directive antenna, means controlled by said compass and antenna to steer the craft along a predetermined course, said means including means responsive to deviation of the craft from the course to rotate said compass and antenna about their respective vertical axes and to rotate the craft about its vertical axis by sufficient amounts to maintain a constant angle between the earth's magnetic field and the compass and directive antenna and an angle between the course and the craft dependent upon the magnitude of the effect of the forces causing deviation from the course.

13. The combination of a compass arranged on a body movable about a vertical axis, said compass having pole pieces extending in a predetermined direction and an armature arranged for rotation between said pole pieces, and means responsive to voltage produced across said armature automatically to maintain said pole pieces in a predetermined direction while maintaining the body in condition for movement about the vertical axis.

14. The combination of a compass arranged on a body movable about a vertical axis, said compass having pole pieces extending in a predetermined direction and an armature arranged for rotation between said pole pieces, and means responsive to voltage produced across said armature in response to movement of said body in either direction to rotate said pole pieces in the opposite direction sufficiently to maintain said pole pieces in said predetermined direction.

15. The combination on a moving craft, of a directive antenna, a magnetic compass, a mechanical differential mechanism interconnecting said compass and antenna, means operable through said differential mechanism to adjust the angle between said compass and antenna and means operable through said differential mechanism to maintain said compass and antenna at predetermined angles with reference to the direction of the earth's magnetic field.

16. The combination in a system for steering moving craft, of a directive antenna, means responsive to the output from said antenna for steering said craft a direction determined by the direction of propagation of received radio signals, means for maintaining said antenna at a constant angle with reference to north independently of the direction of the fore and aft line of the craft, and means for indicating the angle between said fore and aft line and said antenna.

17. The combination on a moving craft, of a directive antenna, means for maintaining said antenna at a constant angle with reference to the earth's magnetic field irrespective of the movement of the craft, means responsive to said directive antenna for producing an electromotive force upon deviation of said craft from a predetermined course, and means for steering said craft in accordance with said electromotive force.

18. A system for compensating for drift of a craft moving along a predetermined course including a compass arranged to produce an electromotive force in accordance with a change in direction of said craft, means for indicating drift of said craft from said course, means for changing the position of said last means and said compass dependently upon said drift, and means for guiding said craft in accordance with said electromotive force to maintain said craft along said course.

19. A system for craft moving along a predetermined course comprising in combination a directive antenna, means for maintaining said antenna at a constant angle with the earth's magnetic field irrespective of the movement of said craft, means responsive to said antenna for producing an indication in accordance with the drift of said craft from said predetermined course, and means for causing said craft to head toward said course by an angle sufficient to overcome the effects of the forces tending to cause said craft to drift thereby maintaining said craft on said course.

20. The combination on a moving craft of direction sensitive means for steering the craft along a predetermined course, and means responsive to the direction of propagation of received radio waves to vary the fore and aft line of the craft in such a way that the craft follows said course irrespective of forces tending to cause said craft to drive away from said course.

HOWARD I. BECKER.